(12) United States Patent
Liebmann

(10) Patent No.: US 7,939,001 B2
(45) Date of Patent: May 10, 2011

(54) METHOD AND APPARATUS FOR PRODUCING FIBRE COMPOSITE MOULDINGS BY MEANS OF VACUUM INFUSION

(75) Inventor: Axel Liebmann, Vejle Øst (DK)

(73) Assignee: LM Glasfiber A/S, Lunderskov (DK)

( * ) Notice: Subject to any disclaimer, the term of this patent is extended or adjusted under 35 U.S.C. 154(b) by 313 days.

(21) Appl. No.: 11/791,710

(22) PCT Filed: Nov. 30, 2005

(86) PCT No.: PCT/DK2005/000766
§ 371 (c)(1),
(2), (4) Date: Dec. 5, 2007

(87) PCT Pub. No.: WO2006/058541
PCT Pub. Date: Jun. 8, 2006

(65) Prior Publication Data
US 2009/0115112 A1 May 7, 2009

(30) Foreign Application Priority Data
Nov. 30, 2004 (DK) .................................. 2004 01865

(51) Int. Cl.
B29C 45/14 (2006.01)
(52) U.S. Cl. .................. 264/257; 264/510; 425/120
(58) Field of Classification Search .................. 425/120; 264/257, 510
See application file for complete search history.

(56) References Cited

U.S. PATENT DOCUMENTS

| 5,403,537 A | 4/1995 | Seal et al. |
| 6,257,858 B1 | 7/2001 | Pabsch et al. |
| 7,147,818 B1 * | 12/2006 | Rigas et al. .................. 264/510 |
| 2003/0011094 A1 * | 1/2003 | Filsinger et al. ............. 264/102 |
| 2004/0130072 A1 | 7/2004 | Sekido et al. |

FOREIGN PATENT DOCUMENTS

| DE | 198 53 709 C1 | 2/2000 |
| DE | 199 22 850 C1 | 8/2000 |
| DE | 19922850 * | 8/2000 |
| EP | 1 555 104 A1 | 7/2005 |
| WO | 2004/033176 A1 | 4/2004 |

* cited by examiner

Primary Examiner — Yogendra N Gupta
Assistant Examiner — Alison Hindenlang
(74) Attorney, Agent, or Firm — The Nath Law Group; Jerald L. Meyer; Sungyeop Chung

(57) ABSTRACT

Apparatus and method of producing fiber composite moldings by means of vacuum infusion applying a mold with a mold cavity, a plurality of inlet channels (3, 21, 22) communicating with the mold cavity and a polymer source (7) with liquid polymer, a plurality of vacuum channels (2) communicating with the mold cavity and a vacuum source (10), where fiber material (14) is inserted into the mold cavity prior to the process of filling said mold, and where a negative pressure is generated in the vacuum channels (2) and thus in the mold cavity with the result that liquid polymer is drawn from the polymer source (7) via the inlet channels (3, 21, 22) into the mold cavity. One or more of the inlet channels (3, 21, 22) can also communicate with a vacuum source, and/or one or more of the vacuum channels (2) can also communicate with a polymer source (7).

9 Claims, 1 Drawing Sheet

US 7,939,001 B2

METHOD AND APPARATUS FOR PRODUCING FIBRE COMPOSITE MOULDINGS BY MEANS OF VACUUM INFUSION

TECHNICAL FIELD

The invention relates to a method according to the preamble of claim 1 and to an apparatus according to the preamble of claim 9.

Thus the invention relates to a method and an apparatus for producing fibre composite mouldings by means of VARTM (vacuum assisted resin transfer moulding), where liquid polymer, also called resin, is filled into a mould cavity, in which fibre material priorly has been inserted, where a vacuum is generated in the mould cavity hereby drawing in the polymer. Often a minor positive pressure is generated at the inlet side in order to improve the filling therein of polymer.

Vacuum infusion is a process used for moulding fibre composite mouldings, where uniformly distributed fibres, said fibres being rovings, i.e. bundles of fibre bands, bands of rovings or mats, which are either felt mats made of individual fibres or woven mats made of fibre rovings, are layered in one of the mould parts. The second mould part is often made of resilient vacuum bag, and is subsequently placed on top of the fibre material. By generating a vacuum, typically 80 to 90% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as a negative pressure, is generated via the vacuum channels in the mould cavity, whereby liquid polymer is drawn into the mould cavity via the inlet channels in order to fill said mould cavity. From the inlet channels the polymer disperses in the mould cavity as a flow front moves towards the vacuum channels. Thus it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and possibly an overpressure at the inlet side. In connection with vacuum infusion, employing a solid mould part and a resilient mould part in the form of a vacuum bag, the dry spots can be repaired after the process of filling the mould by for example puncturing the cloth in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag, which is not desirable, especially not when the polymer has not hardened, as it can result in deformations in the inserted fibre material and thus in a local weakening of the structure, as well as result in an unintentional perforation of the vacuum bag.

BACKGROUND ART

DE 199 22 850 discloses an apparatus for producing fibre composite mouldings. The apparatus includes a mould part, where the channels extend in the longitudinal direction of the apparatus below the moulding surface, and where the channels are connected to said surface through bores or longitudinal slots. A plurality of valve members communicating with a vacuum source and a resin source, respectively, is placed at each end of the channels. Every second channel communicates with the vacuum source, and every second channel communicates with the resin source, and by time varying the setting of the valve members the flow front of the resin can be controlled during the impregnation process.

EP-A-1555104, which is equivalent to WO 2004/033176, describes a method of resin transfer moulding, wherein a fibre material is placed in a mould, where a first distribution medium for distribution of polymer is placed on a first surface of the fibre material, and where a second distribution medium is placed on the other surface of the fibre material. The first distribution medium exhibits a flow resistance, which is lower than that of the second distribution medium. During an impregnation process, air is evacuated through the second distribution medium via vacuum channels, while liquid polymer is supplied to the first distribution medium. According to a particular embodiment (shown in FIG. 4) the mould is first evacuated by use of vacuum channels, after which polymer via a number of inlet channels is supplied to the bottom of the fibre material. Since the fibre material can be relatively thick, it can be problematic to supply polymer to the top of the fibre material. Therefore, one of the vacuum channels can at the end of the impregnation process be connected to a polymer source by closing a first valve and opening a second valve, thereby supplying polymer to the top of the fibre material via the one vacuum channel. Thereby, it is possible to supply polymer to the top of the fibre material. Additionally, air pockets at the top of the fibre material can be moved towards the other vacuum channel.

DISCLOSURE OF INVENTION

The object of the invention is to provide a method and an apparatus avoiding these draw-backs. By means of the method according to the invention this object is achieved by periodically interrupting the connection of one or more of the inlet channels to the polymer source during the process of filling the mould, and by connecting said inlet channel or inlet channels to a vacuum source, so that liquid polymer in the mould cavity is drawn into the direction of said inlet channels, and/or by periodically interrupting the connection of one or more of the inlet channels to the vacuum source during the process of filling the mould, and by connecting said vacuum channel or channels to a polymer source, so that liquid polymer is drawn into the mould cavity through said vacuum channel or channels. Usually the vacuum channels and the inlet channels have one function only, as the vacuum channels draw air out of the mould cavity, and the inlet channels direct liquid polymer into the mould cavity. Periodically allowing the inlet channels or the vacuum channels to have the reverse function according to the invention results in much greater flexibility. If, for example, a dry spot has occurred adjacent an inlet channel, a vacuum can be generated in said inlet channel, thus drawing the polymer around the dry spot in the direction of the respective inlet channel and pressing the dry spot into the same direction thus impregnating the area. Due to a pressure drop which increases with the distance from the vacuum channel, it can be difficult to remove dry spots found at a large distance from a vacuum channel. Leaks between the mould cavity and its surroundings, for example due to a punctured vacuum bag, also result in a pressure drop and thus increase the risk of dry spots. The option of drawing air out via the inlet channels instead of only drawing air out via the vacuum channel according to the invention provides an improved possibility of generating a powerful local vacuum.

According to an embodiment, the mould cavity is formed by a solid mould part and a resilient vacuum bag. The invention is particularly suitable for this type of mould as the use of a vacuum bag includes a particular risk of leaks.

According to an advantageous embodiment, the inlet channels and/or vacuum channels are placed against the vacuum bag.

According to a preferred embodiment, the inlet channels and/or vacuum channels are shaped as oblong hollow profile bodies, the interior of which communicates with the interior of the mould cavity through one or more slots extending in the longitudinal direction of the profile body.

According to a particularly advantageous embodiment, the slot or the slots in one or more of the oblong hollow profile bodies are covered by a semi-permeable membrane admitting air, but not admitting liquid polymer, and which are only partly fixed to the profile body. For example, the membrane can be fixed on one side of the slot but not on the other side of the slot. As a result, the profile body obtains the function of a "flap valve", as the profile body allows for the discharge of liquid polymer when applied as an inlet channel, because one side of said membrane is pressed away from the profile body, or because the profile body is pressed away from the membrane thus creating an opening between the membrane and one side of the profile body. When the profile body is used as a vacuum channel, the negative pressure in the interior of the profile body draws in the membrane so that it abuts said profile body, thus only admitting air into the interior of the profile body through the pores of the semi-permeable membrane. In this manner polymer is prevented from being drawn out of the mould cavity.

According to one embodiment, the body produced is an oblong shell member, where the oblong profile bodies extend substantially parallel in the longitudinal direction of the shell member, the process of filling the mould starting with a plurality of the inlet channels communicating with the vacuum source. As a result a fast evacuation of air from the mould cavity takes place, where a flow front for the polymer drawn into the mould cavity moves towards the inlet profile bodies, and where the vacuum connection to the individual profile bodies is interrupted, when the flow front reaches said profile bodies as said profile bodies are subsequently connected to the polymer source. As a result, a particularly fast and efficient filling of the mould is achieved as a powerful vacuum is ensured adjacent the flow front at the same time as the feeding of polymer is ensured adjacent the flow front.

According to an embodiment, the process of filling the mould starts with one or more of the centrally placed inlet profile bodies communicating with the polymer source as the flow front moves from the polymer source in the direction of the longitudinal sides of the shell member. Thus a particularly fast and efficient filling of the mould is achieved.

According to one embodiment, the body is a blade shell half or a complete blade shell for a blade of a wind turbine.

The apparatus according to the invention includes a mould with a mould cavity, a polymer source for liquid polymer, a plurality of inlet channels, which are connected to the mould cavity and via valve members are connected to the polymer source, a vacuum source, a plurality of vacuum channels, which are connected to the mould cavity and via valve members are connected to the vacuum source, characterized in that one or more of the inlet channels by means of valve members also are connected to a vacuum source, and/or that one or more of the vacuum channels via valve members also are connected to the polymer source.

BRIEF DESCRIPTION OF THE DRAWINGS

The invention is explained in detail below with reference to an embodiment shown in the drawings, in which.

BEST MODE FOR CARRYING OUT THE INVENTION

Figure 1:
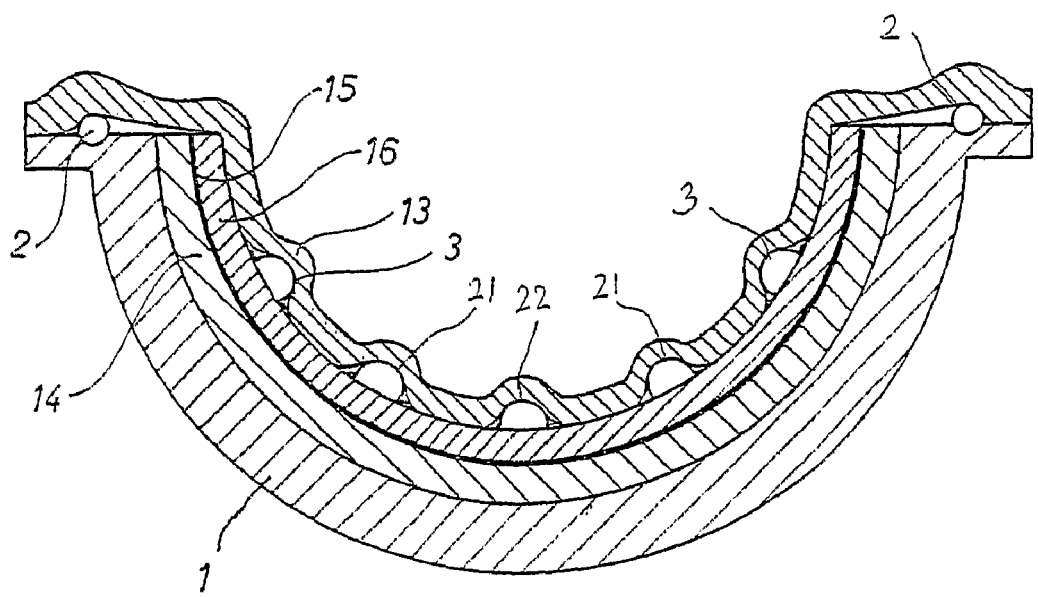
FIG. 1 is a sectional view along line I-I in FIG. 2 through a mould for the production of a blade shell half.

FIG. 1 is a sectional view through a mould for the production of a blade shell half for a blade of a wind turbine by vacuum infusion and shows a solid mould part 1 with a top side mating to the exterior top side of the completed blade shell half. A fibre insertion 14 of for example glass fibre or carbon fibre is placed on the inner top side of the mould part 1. On top of the fibre insertion 14, a tear-off layer 15 is placed which can be a net or a perforated film, and on top of the tear-off layer 15 a distribution net or a flow layer 16 is placed. On top of the distribution net/flow layer 16 a plurality of Q-shaped inlet profile bodies 3, 21, 22 are placed, said bodies including a longitudinal slot facing the distribution net 16. On top hereof an air-tight vacuum bag 13 is placed. At the flanges of the mould, vacuum channels are provided in the form of perforated vacuum tubes 2. According to prior art, the vacuum tubes 2 communicate with a vacuum source, and the inlet profile bodies 3, 21, 22 communicate with a polymer source with liquid polymer.

The vacuum in the vacuum channels 2 generate a vacuum in the mould cavity between the solid mould part 1 and the vacuum bag 13, and thus polymer is drawn or sucked through the inlet profile bodies 3, 21, 22 downwards into the distribution net 16 and along said distribution net 16 through the tear-off layer 15, as it spreads and impregnates the fibre insertion 14. Upon the completion of curing the vacuum bag 13, the inlet profile bodies 3 and the distribution net 16 are removed by means of the tear-off layer 15.

According to the invention the inlet profile bodies 3, 21, 22 and the vacuum channels 2 are not limited to the function described above, as during the process of filling the mould, one or more of said inlet profile bodies 3, 21, 22 can communicate periodically with a vacuum source instead of with the polymer source, and the vacuum channels 2 can communicate with a polymer source instead of the vacuum source. Thus the process of filling the mould can start with only the middle one of the inlet profile bodies 22 communicating with the polymer source, as the remaining juxtaposed inlet profile bodies 21, 3 and the vacuum channels 2 communicate with a vacuum source. Thus the inflowing polymer spreads from the middle inlet profile body 22 towards the closest two inlet profile bodies 21. When the flow front reaches the latter, their connection to the vacuum source is disrupted, and they are connected to the polymer source. Subsequently, the flow front moves on towards the next inlet profile bodies 3 etc. Thus a pressure drop resulting from any possible unintentional perforation of the vacuum bag 13 and/or a strong air resistance either in the fibre insertion 14 pressed together due to the vacuum or in the distribution net does not prevent a powerful vacuum from applying adjacent the flow front. A possible dry spot can also be removed again by connecting one of the inlet profile bodies with the vacuum source thus reversing the flow direction of the polymer.

Figure 2:
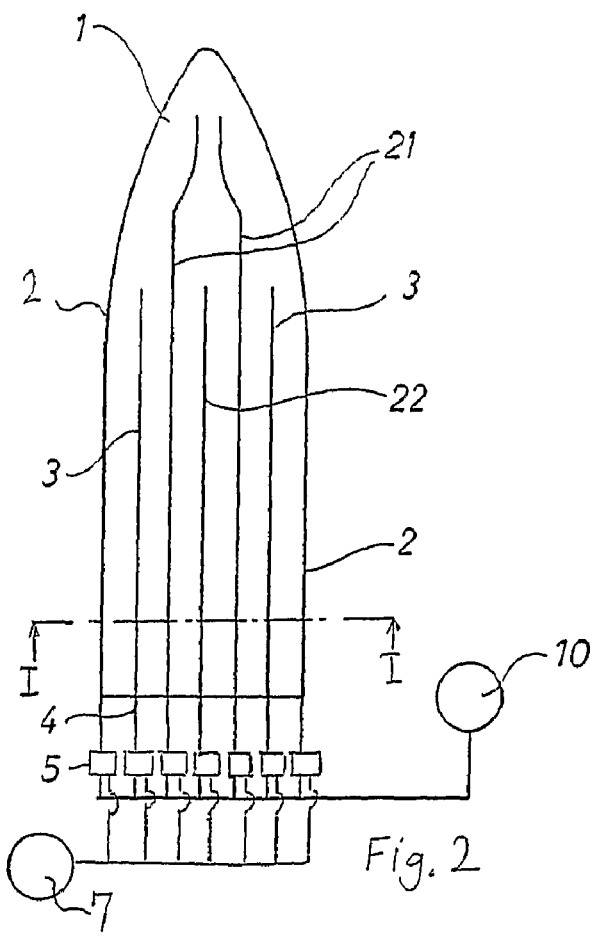
FIG. 2 is a schematic view of an apparatus for carrying out the method according to the invention.

FIG. 2 shows a schematic view of the apparatus according to the invention. The mould 1 has an outline corresponding to the outline of a blade shell half. Each vacuum channel 2 and each inlet profile body 3, 21, 22 communicate via an inlet of the mould 4 with a valve member 5, which in turn communicates with both a polymer source 7 and a vacuum source 10.

Figure 3:
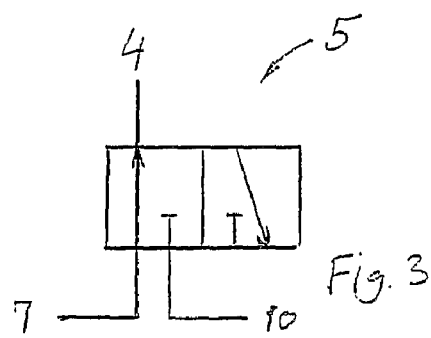
FIG. 3 shows a valve body included in the apparatus shown in FIG. 2.

FIG. 3 shows a schematic view of one of the valve members 5. As it can be seen, the valve member is a three-way valve member with two positions. In the position shown in FIG. 3, the inlet of the mould 4 communicates with the polymer source 7. If the valve member 5 is set into its second position, the inlet of the mould 4 is connected to the vacuum source 10. Of course, the valve member 5 can also be shaped as a valve with for example three positions, in the middle position blocking the polymer source 7 as well as for the vacuum source 10. It goes without saying that other types of valve members can be applied as well, as it is essential that the inlet of the mould 4 can communicate with both a polymer source 7 and a vacuum source 10.

Figure 4:
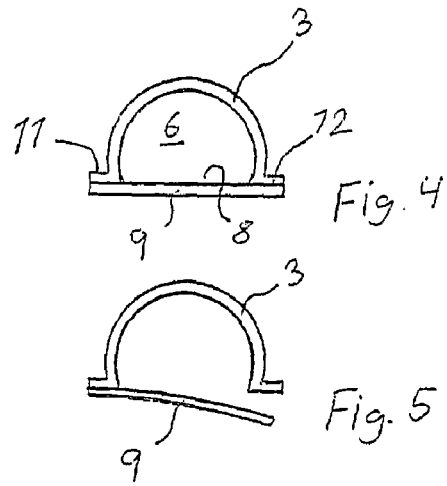
FIG. 4 is a sectional view through an inlet profile body in a state, where it communicates with a vacuum source.
Figure 5:
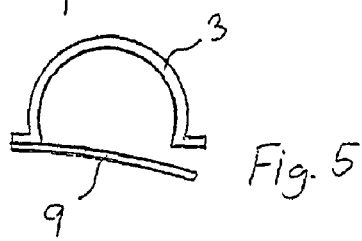
FIG. 5 is a sectional view through the inlet profile body shown in FIG. 3 in a state, where it communicates with a polymer source.

FIGS. 4 and 5 show a cross-section through an inlet profile body 3 according to a particular embodiment. In the cross-section the inlet profile body 3 is Q-shaped as it includes a cylindrical wall and two flap parts 11, 12. A slot 8, extending in the longitudinal direction of the profile body 3 between the two flap parts 11, 12 connects the interior 6 of the profile body 3 with the mould cavity. The slot 8 is covered by a semi-permeable membrane 9 extending from one flap part 11 to the second flap part 12. The membrane 9 is semi-permeable in the sense that it admits air but not liquid polymer. The membrane 9 is only secured to the profile body 3 at one end of the flap part 11 and thus it has the function of a flap valve or a flap check valve together with the profile body 3. When the inlet profile body 3 communicates with the vacuum source 10, the negative pressure draws in the membrane 9, so that it abuts the second flap part 12 and blocks the passage of liquid polymer. When the inlet profile body 3 communicates with the polymer source 7, the negative pressure in the mould cavity draws the semi-permeable membrane 9 away from the second flap part 12, as shown in FIG. 5, whereby liquid polymer can flow from the interior of the profile body 3 and into the mould cavity. If the membrane 9 cannot be moved inwards towards said mould cavity due to the fibre material in the mould cavity, and if a slight positive pressure is generated in the interior 6 of the inlet profile body, the profile body 3 lifts up the vacuum bag 13 thus allowing liquid polymer to flow into the mould cavity via the slot resulting between the flap part 12 of the profile body and the membrane 9.

In the embodiment shown in FIG. 1 the inlet profile bodies 3, 21, 22 are shaped like Q-formed profile bodies, and the vacuum channels 2 are shaped like perforated tubes. The inlet channels 3, 21, 22 can, however, also be shaped like perforated tubes just as the vacuum channels 2 can be shaped like Q-formed profile bodies. If perforated tubes are applied, these can optionally be reinforced by a helical pin member extending inside the tube and preventing the tube from folding up due to the vacuum.

LIST OF REFERENCE NUMERALS

1 Solid mould part
2 Vacuum channels
3 Inlet channels
4 Inlet of the mould
5 Valve members
6 Interior of the inlet channels
7 Polymer source with liquid polymer
8 Slots
9 Semi-permeable membrane
10 Vacuum source
11 First flap of the inlet profile body
12 Second flap of the inlet profile body
13 Vacuum bag
14 Fibre insertion
15 Tear-off layer
16 Distribution net
21 Inlet channel
22 Inlet channel

The invention claimed is:

1. A method of producing fibre composite mouldings in the form of an oblong shell member by means of vacuum infusion, the method comprising the steps of:

inserting a fiber material into an oblong shell member mould cavity including an inlet channel communicating with the mould cavity, and a vacuum channel communicating with the mould cavity;

connecting a first single switchable valve member to a liquid polymer source via a first injection line through which a liquid polymer from the liquid polymer source communicates with the inlet channel, and to a vacuum source via a first vacuum line through which a negative pressure from the vacuum source is applied on the inlet channel, wherein the first injection line is separated from the first vacuum line by the first valve member;

connecting a second single switchable valve member to the liquid polymer source via a second injection line through which the liquid polymer from the liquid polymer source communicates with the vacuum channel, and to the vacuum source via a second vacuum line through which the negative pressure from the vacuum source is applied on the vacuum channel, wherein the second injection line is separated from the second vacuum line by the second valve member;

connecting the inlet channel to the first single switchable valve member;

connecting the vacuum channel to the second single switchable valve member;

generating the negative pressure in the mould cavity by applying the negative pressure from the vacuum source on the vacuum channel;

drawing the liquid polymer from the liquid polymer source into the mould cavity via the inlet channel; and generating a liquid polymer flow front from the inlet channel toward the vacuum channel, wherein:

the channel and the vacuum channel are oblong and extend substantially parallel to the longitudinal direction of the shell member, the inlet channel is connected to the first single switchable valve member that is switchable between a first switching mode and a second switching mode, wherein in the first switching mode the first valve member interrupts the first vacuum line and opens the first injection line, and in the second switching mode the first valve member interrupts the first injection line and opens the first vacuum line, the one vacuum channel is connected to the second single switchable valve member that is switchable between a third switching mode and a fourth switching mode, wherein in the third switching mode the second valve member interrupts the second vacuum line and opens the second injection line, and in the fourth switching mode the second valve member interrupts the second injection line and opens the second vacuum line, and the third switching mode is implemented by the second single switchable valve member when the flow front from the inlet channel reaches the vacuum channel.

2. The method according to claim 1, further comprising the steps of:

continuing the flow front towards additional juxtaposed inlet channel which is also connected to the vacuum source via a third switchable valve member at the beginning of the process of filling the mould; and interrupting the vacuum connection to the additional inlet channel when the flow front reaches the additional inlet channel as it is subsequently connected to the polymer source.

3. The method according to claim 1, wherein the mould cavity is defined by a solid mould part and a resilient vacuum bag.

4. The method according to claim 3, where the inlet channel and/or the vacuum tubes are placed against the vacuum bag.

5. The method according to claim 1, where the inlet channel and/or the vacuum tubes are shaped as oblong hollow profile bodies, the interior of which communicates with the interior of the mould cavity through one or more slots extending in the longitudinal direction of the profile body.

6. The method according to claim 5, where the slot or the slots in one or more of the oblong hollow profile bodies are covered by a semi-permeable membrane admitting air, but not admitting liquid polymer, and which are only partially fixed to the profile body.

7. The method according to claim 5, wherein prior to the process of drawing the liquid polymer from the liquid polymer source into the mold cavity via the inlet channel, the inlet channel communicates with the vacuum source resulting in a fast evacuation of air from the mould cavity.

8. The method according to claim 7, where the body produced is a blade shell half for a blade of a wind turbine.

9. An apparatus for producing oblong fibre composite mouldings by way of vacuum infusion, said apparatus comprising:

a mould with a mould cavity;

a liquid polymer source for liquid polymer;

a vacuum source;

an inlet channel connected to the mould cavity and a first single switchable valve member;

an vacuum channel, connected to the mould cavity and a second single switchable valve member, wherein:

the first single switchable valve member connected to the liquid polymer source via a first injection line through which the liquid polymer from the liquid polymer source communicates with the inlet channel, and to the vacuum source via a first vacuum line through which a negative pressure from the vacuum source is applied on the inlet channel, wherein the first injection line is separated from the first vacuum line by the first valve member, the second single switchable valve member connected to the liquid polymer source via a second injection line through which the liquid polymer from the liquid polymer source communicates with the vacuum channel, and to the vacuum source via a second vacuum line through which the negative pressure from the vacuum source is applied on the vacuum channel, wherein the second injection line is separated from the second vacuum line by the second valve member, the inlet channel and the vacuum channel are substantially parallel to each other in the longitudinal direction of the mould, the inlet channel is connected to the first single switchable valve member that is switchable between a first switching mode and a second switching mode, wherein in the first switching mode the first valve member interrupts the first vacuum line and opens the first injection line, and in the second switching mode the first valve member interrupts the first injection line and opens the first vacuum line, and the vacuum channel is connected to the second single switchable valve member that is switchable between a third switching mode and a fourth switching mode, wherein in the third switching mode the second valve member interrupts the second vacuum line and opens the second injection line, and in the fourth switching mode the second valve member interrupts the second injection line and opens the second vacuum line.

* * * * *

UNITED STATES PATENT AND TRADEMARK OFFICE
CERTIFICATE OF CORRECTION

| | | |
|---|---|---|
| PATENT NO. | : 7,939,001 B2 | Page 1 of 1 |
| APPLICATION NO. | : 11/791710 | |
| DATED | : May 10, 2011 | |
| INVENTOR(S) | : Axel Liebmann | |

It is certified that error appears in the above-identified patent and that said Letters Patent is hereby corrected as shown below:

Column 6, Claim 1, Line 57
Please delete "the channel and the vacuum channel are oblong"
and replace with --the inlet channel and the vacuum channel are oblong--

Column 7, Claim 1, Line 1
Please delete "the one vacuum channel"
and replace with --the vacuum channel--

Signed and Sealed this
Twenty-first Day of June, 2011

David J. Kappos
*Director of the United States Patent and Trademark Office*